455-2 SR
10/21/86 OR 4,618,995

United States Patent [19]

Kemp

[11] Patent Number: 4,618,995

[45] Date of Patent: Oct. 21, 1986

[54] AUTOMATIC SYSTEM AND METHOD FOR MONITORING AND STORING RADIO USER LISTENING HABITS

[76] Inventor: Saundra R. Kemp, 114 Davis Ave., Staten Island, N.Y. 10310

[21] Appl. No.: 726,672

[22] Filed: Apr. 24, 1985

Related U.S. Application Data

[63] Continuation-in-part of Ser. No. 549,800, Nov. 9, 1983, abandoned.

[51] Int. Cl.[4] ........................ H04H 9/00; H04B 17/00

[52] U.S. Cl. ...................................... 455/2; 179/2 AS

[58] Field of Search ....................... 358/84; 179/2 AS; 455/2, 226, 158

[56] References Cited

U.S. PATENT DOCUMENTS

| | | | |
|---|---|---|---|
| 3,058,065 | 10/1962 | Freeman et al. | 455/2 |
| 3,483,327 | 12/1969 | Schwartz | 358/84 |
| 3,492,577 | 1/1970 | Reiter et al. | 455/2 |
| 3,733,430 | 5/1973 | Thompson et al. | 358/84 |
| 3,803,349 | 4/1974 | Watanabe | 358/84 |
| 3,849,729 | 11/1974 | Van Baggem | 455/2 |
| 4,044,376 | 8/1977 | Porter | 358/84 |
| 4,058,829 | 11/1977 | Thompson | 358/84 |
| 4,258,386 | 3/1981 | Cheung | 455/2 |

FOREIGN PATENT DOCUMENTS

| | | | |
|---|---|---|---|
| 227323 | 12/1975 | France | 358/84 |
| 2142755 | 1/1985 | United Kingdom | 358/84 |

*Primary Examiner*—Marc E. Bookbinder
*Attorney, Agent, or Firm*—John J. Posta, Jr.

[57] ABSTRACT

A system for economically recording information indicating radio stations listened to on a radio is disclosed which analyzes listening habits in a relatively short fundamental time period to determine if within that fundamental time period a particular station was tuned for at least a substantial time period within that fundamental time period. If this criteria is met, the system records the station in a solid state data location. Ratings are determined by the number of data locations each station is stored in over a particular interval.

14 Claims, 1 Drawing Figure

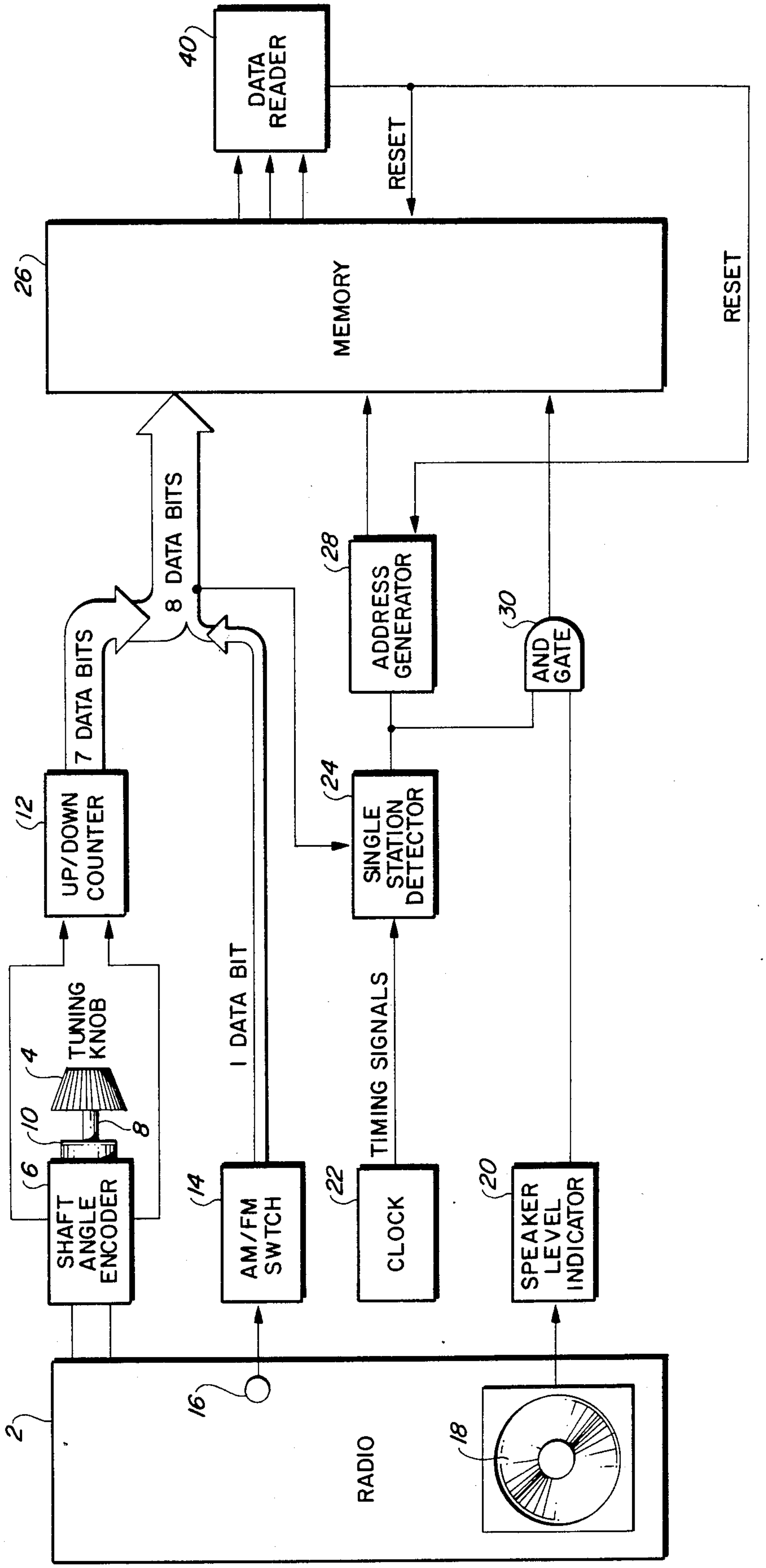
DATA READER
RESET
MEMORY
RESET
8 DATA BITS
7 DATA BITS
UP/DOWN COUNTER
ADDRESS GENERATOR
AND GATE
SINGLE STATION DETECTOR
TUNING KNOB
1 DATA BIT
TIMING SIGNALS
SHAFT ANGLE ENCODER
AM/FM SWTCH
CLOCK
SPEAKER LEVEL INDICATOR
RADIO
40
26
28
30
24
12
4
10
8
6
14
22
20
2
16
18

AUTOMATIC SYSTEM AND METHOD FOR MONITORING AND STORING RADIO USER LISTENING HABITS

CONTINUING APPLICATION

This application is a continuation-in-part of applicant's co-pending application, Ser. No. 549,800, filed Nov. 9, 1983, entitled "Automatic System and Method for Monitoring and Recording Radio Station Usage, now abandoned.

BACKGROUND OF THE INVENTION

Field of the Invention

The present invention relates generally to systems for monitoring the listening habits of radio users, and more particularly to an inexpensive system for providing a highly accurate record of the amounts of time each of a number of radio stations were listened to by a radio user over an extended period of time.

There is a long history of devices designed to monitor viewing habits of people watching television, with such devices generally designed to provide information used to generate ratings used by purchasers of commercials on particular television programs. Virtually all of these devices operate using one of four basic operating techniques.

The first technique, which is the oldest, sends information regarding which channel the receiver is tuned to from the viewers' homes directly to a central monitoring station where the tuning information is evaluated. This approach is illustrated by U.S. Pat. Nos. 3,058,065, to Freeman et al, and 4,048,562, to Haselwood et al. The primary disadvantage of these systems is their extremely high cost. While the television networks are able to afford such an expensive method of determining ratings, most radio stations, particularly those in smaller local markets, simply can't afford to pay for expensive systems such as these, and the use of such systems has accordingly been restricted to use in compiling ratings information for large and wealthy customers such as national television networks.

The second method used is to have the transmitting stations modulate a code signal onto their transmission signals to allow this coded signal to be used at the receivers to provide an indication of the program being monitored in the viewers' homes. Examples of such systems are found in U.S. Pat. Nos. 3,492,577, to Reiter et al, and 4,025,841, to Haselwood et al. It is important to note that the coded signal is inserted periodically, and may be used once per program or at a higher repetition rate per program for longer programs.

It is here that the fundamental difference between radio and television programming is illustrated. Television is *program oriented,* while radio is largely *song oriented,* which means that while if it can be determined that a viewer is listening to a television program at any point during the program, the viewer will likely watch the entire program, a radio listener is likely to change stations on a song basis. Since many radio listeners will change stations to avoid listening to a song they do not like, the phenomenon of changing stations on an irregular and unpredictable basis is unique to radio programming, with the possible exception of talk radio programs, which constitute a definite minority of radio programming.

It is therefore apparent that the use of a periodic signal sent by radio transmitters to radio receivers to determine ratings is not nearly as practical as it is in television broadcasts. In addition, another serious problem is present in this technique. While the system of using different codes for different transmitters is practical for use with a small number of stations, such as the three large television networks, it is not acceptable in radio, where in large markets there are literally dozens of radio stations. It is unlikely that a large percentage of these stations could be convinced to buy the necessary transmission equipment, particularly since many radio stations operate on a budget which is miniscule in comparison to that of a television network.

The third, and most popular, technique is to record the time of all channel changes, together with the channel. This type of device is taught in U.S. Pat. Nos. 3,453,641, to Rahmel, 3,906,450, to Prado, Jr., 4,258,386, to Cheung, and 4,361,851, to Asip et al, and is used uniquely for television applications. The primary reason this type of system is not used for radio is its complexity of design, which is synonymous with a degree of cost unacceptible to radio stations for the reasons given above. In addition, since the radio station listened to is likely to be changed far more frequently than is a television station, the amount of data collected will be unacceptably large, and more expensive to process.

The fourth technique is to record information regarding the channel periodically, as demonstrated by U.S. Pat. No. 3,849,729, to Van Baggem. The Van Baggem device is, unfortunately, program oriented, recording the channel selected once every 15 minutes, a duration impractical in radio ratings. In addition, the Van Baggem device is cumbersome in construction, periodically turning on a motorized recording unit to store the information. The Van Baggem device is also expensive, making the fourth technique disadvantageous for the reasons given previously.

It is thus apparent that the four techniques used to measure television ratings are either not practicable for measuring radio ratings, or too expensive to be utilized by most radio stations, or both. The technique currently in use to measure radio ratings is that of evaluating a large number of listening logs kept by selected listeners representing a cross-section of the listening audience. While these logs will provide information relatively inexpensively, the validity of a system depending on accurate recording of information by listeners is inherently suspect, particularly when radio stations are apt to be changed so often.

Therefore, there exists a clear need for an accurate system uniquely designed for use in gathering information used in radio ratings. Such a system must be relatively inexpensive, both in construction and in use. Information derived directly from radio use must be accurately stored for an extended period of time, with the collection of this information being simple and easily accomplished. The system must accurately indicate listening periods determined by song length rather than by the substantially longer program length of television. The system should be installable on any radio without interference with normal operation, and must distinguish between AM and FM programming. Finally, the system must be one which will inspire the confidence of the industry, and present the aforementioned advantages without substantial disadvantage.

SUMMARY OF THE INVENTION

The present invention is specifically designed for measurement of radio ratings, and defines a fundamental time period for measurement purposes. If a radio is tuned to a single station for a substantial percentage of this fundamental period, then an appropriate recording is made indicating this fact. The substantial percentage is defined in the preferred embodiment to be 50 percent or more of the fundamental period.

The recording technique used is both inexpensive and highly reliable, comprising one or more solid state memory chips. Information is only stored in the memory during actual operation of the radio, which is indicated in the preferred embodiment by an audio signal being supplied to the speaker which will produce an audible output. This both conserves memory space and provides for simplified evaluation of information read from the memory. In each fundamental period during which the radio is operated, a piece of information representing the radio station the radio is tuned to is stored in one memory location. In the preferred embodiment, the information representing which radio station is being listened to is supplied by a shaft encoder attached to the tuning shaft of the radio. The system is capable of distinguishing between AM and FM stations, and has different identification indicia for each station in the geographic area.

When the information is collected, the number of locations in the memory in which an individual station's identifying indicia is stored indicated the length of time that station was listened to in the time between information collection. At the time at which information is collected, the memory is reset and recording of information begins anew. In the preferred embodiment, the time period between information collections is substantial, for example at least one week.

It is apparent that the system of the present invention presents a practical system for generating radio ratings information. The system may be used with any radio, and provides detailed information on listening habits, which information is only generated when the speaker is being driven at a level indicating listening is occurring. The system is relatively simple in construction, and is thereby inexpensive to construct. Since information need be collected at extended intervals, expense incident to such collection of information is minimized. It may therefore be appreciated that the system provides the aforesaid advantages without substantial disadvantage, thereby representing a substantial improvement over log books without presenting the disadvantages of the television ratings devices described above.

DESCRIPTION OF THE DRAWINGS

These and other advantages of the invention are best understood with reference to the drawing, in which:

The FIGURE shows in schematic fashion a system according to the present invention for storing at intervals defined by a fundamental period information identifying a radio station being listened to for at least 50 percent of that fundamental period, the stored information being accessable at extended intervals to provide ratings information.

DETAILED DESCRIPTION OF THE PREFERRED EMBODIMENT

The preferred embodiment of the present invention is shown in fundamental schematic form in the FIGURE, with the principles underlying the present invention being susceptible to implementation in various circuits apparent to those skilled in the art. Rather than illustrate one or two of the possible electrical schematics, the FIGURE demonstrates the technique which may be used to achieve the advantages of the present invention without any of the significant disadvantages discussed in context with the television rating systems expanded upon above.

The system of the present invention is adaptable for use with virtually any AM/FM radio 2 having a tuning knob 4. The radio 2 is shown in the FIGURE to be connected to a shaft angle decoder 6, which may be removably attached to the shaft 8 of the tuning knob 4 of the radio 2 so that a moveable portion 10 of the shaft angle encoder 6 turns with the tuning knob 4 of the radio 2. Rotation of the tuning knob 4 will then cause a corresponding rotation of the moveable portion 10 of the shaft angle encoder 6. Rotation of the moveable portion 10 of the shaft angle encoder 6 will cause an output to be supplied from the shaft angle encoder 6 to an up/down counter 12.

It may therefore be appreciated that when the tuning knob 4 is turned by the user of the radio 2, an output characteristic of the particular position of the tuning knob 4, and hence the individual station currently being received by the radio 2, will be supplied to the up/down counter 12. In the preferred embodiment the shaft angle encoder 6 used is of the optical encoder type, such as the Litton Model 715, which provides output signals on two lines, with signals on one line indicating clockwise rotation of the moveable portion 10 of the shaft angle encoder 6, and signals on the other line indicating counterclockwise rotation of the moveable portion 10 of the shaft angle encoder 6. Signals on one of the lines from the shaft angle encoder 6 cause the up/down counter 12 to count up, while signals on the other line cause the up/down counter 12 to count down.

The up/down counter 12 provides a seven bit digital output which will indicate the rotational position of the tuning knob 4. It will be recognized by those skilled in the art that seven bit resolution allows 128 discrete positions of the tuning knob 4 to be encoded by the combination of the shaft angle encoder 6 and the up/down counter 12. These positions range from one end of the tuning scale of the radio 2 to the other, and it will be appreciated that each station tunable by the radio will be identified by a unique digital seven bit number. When the system is installed on the radio 2, the installer can note the digital output from the up/down counter 12 which characterizes each radio station.

Since radios monitored in ratings determination are AM/FM models, and since AM/FM radios use the same tuning scale and tuning knob for both AM and FM, it is necessary to provide an indication of which frequency band is being listened to. This is done by an output derived from the position of an AM/FM switch 14 attached to the AM/FM selector 16 on the radio 2. The AM/FM switch 14 provides a single bit digital output indicating which frequency band is being tuned. A one (1) could indicate AM, with a zero (0) indicating FM, or vice versa. In either case, it will be recognized that the seven bit output from the up/down counter 12 and the single bit from the AM/FM switch 14 together define the particular AM or FM station being tuned on the radio 2. The installer will note which bit level indicates AM and which indicates FM when he installs the AM/FM switch 14 onto the radio 2, generally onto an AM/FM selector 16 on the radio 2.

Obviously, it is desireable to provide a record of which stations the radio 2 is tuned to only when the radio is turned on and an audible output is being delivered from a speaker 18 of the radio 2. Therefore, a speaker level indicator 20 is utilized which provides a digital output indicating the presence or absence of an audible audio signal from the speaker 18. For purposes of the example illustrated in the FIGURE, the output of the speaker level indicator 20 is defined to be a one (1) when the speaker 18 is producing an audible level of sound and a zero (0) when the speaker 18 is not producing an audible level of sound. The speaker level indicator 20 is also installed on the radio 2 by the installer, typically across speaker terminals of the speaker 18. An alternative is to monitor the on/off switch (not shown) of the radio 2, but this is felt to be a less accurate approach since the radio 2 could be left on with the volume turned down.

A clock 22 is used to provide timing signals to the system, which clock 22 may be of the type comprising a quartz oscillator and digital counters, which type is well known in the art. The timing signals from the clock 22 are provided to a single station detector 24, which is also provided with the eight bits of data from the up/down counter 12 and the AM/FM switch 14. The function of the single station detector 24 is to determine whether a single station is being tuned for at least 50 percent of a fundamental period, which period in the preferred embodiment is two minutes. The single station detector 24 thus measures the length of time a single station is being tuned on the radio 2.

If in the two minute period a single station is being tuned by the radio 2, which fact is indicated by the eight bits of data having a single value for at least a one minute length of time during the two minute period, the single station detector 24 will provide a particular single bit digital output at the end of the two minute period, in the case of the example illustrated in the FIGURE a one (1) instead of a zero (0). The one (1) supplied from the single station detector 24 is of short duration at the end of the fundamental period, returning then to a zero (0). For each two minute period in which a single station is tuned in by the radio 2, a one (1) will be output from the single station detector 24.

It is important to note that the one (1) will be assured of being output as soon as the single station has been tuned for a measured time period of one minute in the two minute period, thereby assuring that the one (1) will be output from the single station detector 24 while the station tuned for at least one minute in the two minute period is still tuned. This ensures that the data representing that station will be recorded. At the beginning of each two minute time period the measured time representing the length of time a single station has been tuned will be reset to zero. This time will also be reset to zero whenever the tuning knob 4 is turned to tune another station, thereby changing the data supplied from the up/down counter 12 and starting again only when rotation of the tuning knob 4 stops. Of course, this time is also reset whenever the AM/FM selector 16 on the radio 2 is switched from AM to FM, or vice versa.

Only when a single station is tuned for one continuous minute in the two minute period is a one (1) output from the single station detector 24. Note that both the two minutes of the fundamental time period and the 50 percent or one minute of this fundamental time period may be varied without departing from the spirit of the invention, with the values given herein only being those of the preferred embodiment.

The data generated is stored in a memory 26, which may be a digital semiconductor chip or chips having eight bit word memory storage capacity, which chips are well known in the art. Depending on the length of time between readings of the contents of the memory 26 and the duty cycle of the radio 2, the size of the memory may vary over a wide range. For example eight 4K chips provide 32K of memory which would last from 5.69 days at a 100 percent duty cycle to 22.76 days at a 25 percent duty cycle. A single one of the currently available 64K chips would last one month at a 37 percent duty cycle. The choice of memory capacity needed will thus depend on the interval between readings of the memory 26, as well as the estimated maximum duty cycle.

The eight bits of data from the up/down counter 12 and the AM/FM switch 14 are supplied to the memory 26. The address in the memory in which the next data indicating the particular station tuned will be stored in the memory 26 is determined by an address generator 28, which generates ascending addresses in the memory 26. The address generator 28 in the preferred embodiment steps one address location each time the output from the single station detector 24 goes from one (1) back to zero (0), to prepare for the next data to be stored.

Data is stored in the location assigned by the address generator 28 in the memory 26 when an enable signal of one (1) is provided from an AND gate 30 to said memory 26, which enable signal is a one (1) when the outputs of both the speaker level indicator 20 and the single station detector 24 are ones (1's). It is therefore apparent that data representing a particular radio station may be stored in the memory only once in each fundamental time period of two minutes, and then only if and when a single radio station has been tuned for a 50 percent or one minute time period during said two minute fundamental time period.

Each time the eight bits of data representing a particular radio station are stored, it is a representation that the particular radio station was listened to for two minutes, an accurate approximation. By the number of times data representing a number of radio stations are stored in the memory 26 between intervals at which the data is read from the memory 26, the amounts of time each radio station was listened to in the intervals may be determined, representing information precisely and accurately delivering ratings.

The data may be read from the memory 26 by connection of a data reader 40, which is shown connected in the FIGURE, but, practically speaking, is only connected when data is to be read from the memory 26. After reading the data from the memory 26, the data reader 40 resets the memory 26 to a condition in which no data is left in the memory 26. The data reader 40 also resets the address generator 28 to the first location in the memory 26.

The cumulative time each station was listened to in the intervals between collection of data is easily determined by merely counting the number of data recordings for each station, and multiplying by the fundamental time period of two minutes.

It will be appreciated by those skilled in the art that the present invention may be economically constructed using inexpensive components, representing a substantial advantage over those systems used to measure television ratings. The system of the present invention may be attached to any radio, and will store information over a considerable period of time, making information collection more infrequent and thus more inexpensive. It may be battery powered, making it entirely self-contained. Since this system is designed for radio ratings, it produces a highly accurate representation of listening habits, unlike the systems designed for television and adapted for radio.

No remote receiver is necessary, and radio stations are not required to broadcast any special signals, thereby making the present invention useable to rate all radio stations, not just participating stations. While the frequency at which information is recorded is meaningful to radio ratings, it is done in a manner easily decipherable to determine ratings of each station. It is therefore apparent that the present invention presents a highly advantageous system, which provides accurate ratings of radio stations at a relatively inexpensive price.

It will be apparent to those skilled in the art that a number of changes, modifications, or alterations to the present invention as described herein may be made, none of which depart from the spirit of the present invention. All such changes, modifications, and alterations should therefore be seen as within the scope of the present invention.

What is claimed is:

1. A system for monitoring and recording the listening habits of a radio user listening to a radio having a speaker, comprising:

first means operatively connected to said radio for providing first data, said first data indicating whether said radio is tuned to an AM station or an FM station;

second means operatively connected to said radio for providing second data, said second data indicating the particular radio station said radio is tuned to;

means for detecting whether said radio is tuned to a single station, said detecting means providing an output indicating said radio is tuned to a single station by monitoring said first and second data to determine when said first and second data remain constant for at least a predetermined length of time during a predetermined fundamental time period, said predetermined length of time representing a particular percentage of said predetermined fundamental period of time;

third means operatively connected to said radio for providing an indication of when an audible level of sound is being produced by said speaker, to thereby indicate when said radio is being used;

memory means for storing information;

means for generating addresses in said memory in which information will be stored; and means for enabling said first and second data to be stored in said memory means at an address generated by said generating means whenever said detecting means provides an output indicating said radio is tuned to a single station and said third means provides an indication that an audible level of sound is being produced by said speaker.

2. A system as defined in claim 1, further comprising:

means for reading information stored in said memory means, said reading means first reading said information stored in said memory means and then resetting both said memory means and said generating means.

3. A system as defined in claim 1, wherein said radio is tuned by a tuning knob mounted on a shaft, said second means comprising:

a shaft angle encoder mounted on said shaft, said shaft angle encoder having a moveable portion rotating with said shaft and said tuning knob, said shaft angle encoder producing an first output and a second output, said first output indicating clockwise motion of said tuning knob and said second output indicating counterclockwise motion of said tuning knob; and an up/down counter for receiving said first and second outputs from said shaft angle encoder, said up/down counter producing a seven bit digital output comprising said second data and indicating the rotational position of said tuning knob, with said first data from said first means comprising a one bit digital output, said seven bit digital output and said one bit digital output together defining the particular radio station said radio is tuned to.

4. A system as defined in claim 3, wherein said shaft angle encoder is an optical encoder.

5. A system as defined in claim 1, wherein said radio has an AM/FM selector, said first means being operatively connected to said AM/FM selector to produce said first data.

6. A system as defined in claim 1, wherein said detecting means comprises:

clock means for producing timing signals;

a single station detector having as inputs said first and second data and said timing signals, said single station detector measuring the length of time said first and second data remain constant, with the measured length of time being reset once each predetermined fundamental time period, said measured length of time also being reset whenever any of said first and second data change.

7. A system as defined in claim 6, wherein said single station detector produces a digital one (1) output at the end of said predetermined fundamental time period as said output indicating said radio is tuned to a single station, and a digital zero (0) the rest of the time.

8. A system as defined in claim 7, wherein said third means produces a digital output of one (1) when an audible level of sound is being produced by said speaker, and a digital output of zero (0) when an audible level of sound is not being produced by said speaker.

9. A system as defined in claim 8, wherein said enabling means comprises:

a digital AND gate connected to receive the outputs of said single station detector and said third means, which AND gate produces a digital enable signal supplied to said memory means when both the output of said single station detector and the output of said third means are digital ones (1's).

10. A system as defined in claim 7, wherein said generating means comprises:

an address generator for generating ascending addresses in said memory means, said address generator stepping one address location each time the output from said single station detector goes from one (1) back to zero (0), to prepare for the next data to be stored in said memory means.

11. A system as defined in claim 1, wherein said memory means comprises:

at least one semiconductor memory chip for storing data generated by said system.

12. A system for monitoring and recording the listening habits of a radio user listening to a radio having a tuning knob mounted on a shaft, an AM/FM selector, and a speaker, said system comprising:

a shaft angle decoder mounted on said shaft for producing an first output and a second output, said first output indicating clockwise motion of said tuning knob and said second output indicating counterclockwise motion of said tuning knob;

an up/down counter for receiving said first and second outputs from said shaft angle encoder, said up/down counter producing seven data bits which indicate the rotational position of said tuning knob;

an AM/FM switch operatively connected to said AM/FM selector, said AM/FM switch producing one data bit which indicates whether said radio is tuned to an AM band or an FM band;

a speaker level indicator for providing an output indicating when an audible level of sound is being produced by said speaker, to thereby indicate when said radio is being used;

a clock for producing timing signals;

a single station detector having as inputs eight data bits including said seven data bits from said up/-down counter and said one data bit from said AM/FM switch and said timing signals, said single station detector measuring the length of time said eight data bits remain constant during a two minute fundamental time period, with the measured length of time being reset once each predetermined fundamental time period or whenever any of said eight data bits change, said single station detector producing an output indicating when said measured length of time reaches one minute in said two minute period;

an AND gate for producing an enable signal whenever said speaker level indicator produces said output indicating an audible level of sound is being produced by said speaker and said single station detector produces said output indicating said measured length of time has reached one minute;

an address generator for providing an address at which data can be stored; and a solid state memory for storing said eight data bits at the address provided by said address generator whenever said enable signal is produced by said AND gate.

13. A method of monitoring and storing the listening habits of a radio user, comprising:

providing a one bit digital output to indicate whether a radio is tuned to the AM band or the FM band;

providing a seven bit digital output to indicate what particular radio station said ratio is tuned to;

checking over a two minute period to see if the eight bits including said one bit and said seven bits remain constant for at least a one minute period during said two minute period;

storing said eight bits in a memory location of a memory once each two minute period if said eight bits remained constant for at least said one minute period during said two minute period and said radio is playing at an audible level;

repeating the above steps every two minutes and moving to a new memory location each time each eight bits are stored in said memory.

14. A method as defined in claim 13, further comprising:

reading information stored in said memory, and beginning the sequence of steps again.

* * * * *